Figure 1:
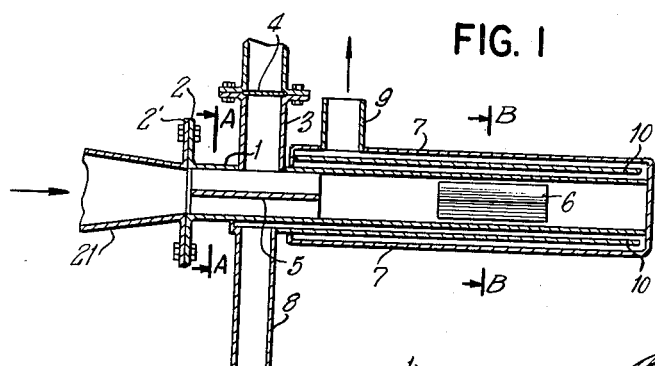

Dec. 9, 1958 G. GRECO 2,863,749
PROCESS FOR THE PRODUCTION OF SYNTHESIS
GAS WITHOUT CATALYSTS
Filed Jan. 19, 1956

INVENTOR.
Guido Greco

United States Patent Office 2,863,749
Patented Dec. 9, 1958

2,863,749

PROCESS FOR THE PRODUCTION OF SYNTHESIS GAS WITHOUT CATALYSTS

Guido Greco, Milan, Italy, assignor to Montecatini, Societa Generale per l'Industria Mineraria e Chimica, a corporation of Italy Application January 19, 1956, Serial No. 560,263

Claims priority, application Italy January 28, 1955

4 Claims. (Cl. 48—212)

The present invention relates to the production of synthesis gas (carbon monoxide and hydrogen) by means of partial combustion of vaporizable petroleum fractions.

In U. S. patent application Serial No. 536,510, filed September 26, 1955, of which this application is a continuation-in-part, a process and devices are disclosed whereby it is possible to produce synthesis gas in the absence of a catalyst by a partial combustion of gaseous aliphatic hydrocarbons without dilution with an inert gas or steam. One particular advantage of this process is the avoidance of gas black formation.

For this purpose, the gaseous hydrocarbon is efficiently premixed with oxygen outside of and prior to introduction into a reaction chamber. This premixing is accomplished by impacting streams of the respective gases upon each other in such manner that the opposed effective components of the kinetic energies of the two gases are made practically equal to each other and are held within definite limits. An apparatus for carrying out this process is characterized by the absence of any catalyst within the burner, by a premixer adapted for a rapid and uniform mixing of the two gases and by a water-cooled outflow tube. According to said application, the process requires a temperature of less than 1000° C.

I have now discovered that the process and devices disclosed in the aforementioned application can be used in connection with vaporized mixtures of higher hydrocarbons, such as liquid petroleum fractions, or hydrocarbon mixtures obtained upon partial heat-volatilization of crude oil. Aside from the advantages gained that are similar to those attained when employing the process and starting materials of the aforenamed application, the use of mixtures of higher hydrocarbons tends to greatly reduce the production costs.

It is, therefore, the object of the present invention to improve upon the process of making synthesis gas by (a) eliminating the use of catalysts and furnishing a method that (b) demands substantially little reactor space, (c) requires unexpectedly low reaction temperatures, (d) does not require the addition of any inert gas or steam, (e) substantially avoids the formation of gas black, and (f) uses vaporized liquid hydrocarbon mixtures as starting materials.

The process is best carried out by means of one of the devices set forth and claimed in the aforementioned application, the description and drawing of which are included in this disclosure. Accordingly, in the drawings—

Figure 2:
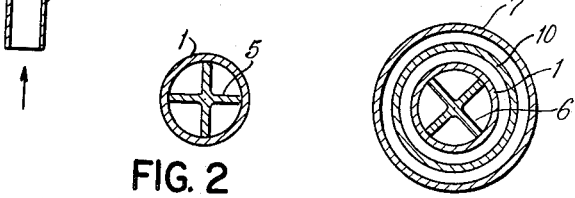
Figure 2:
Figure 3:
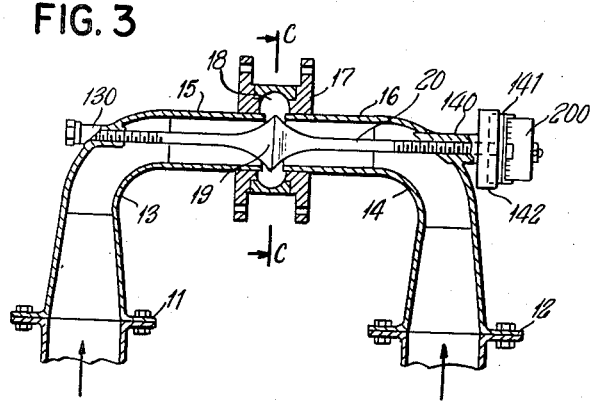
Figure 4:
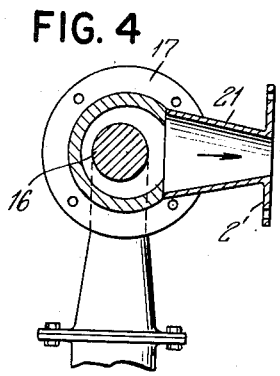
Figure 6:
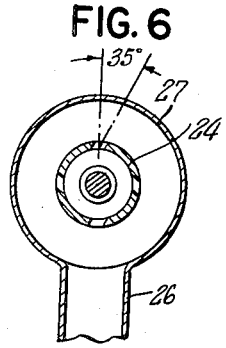
Figure 5:
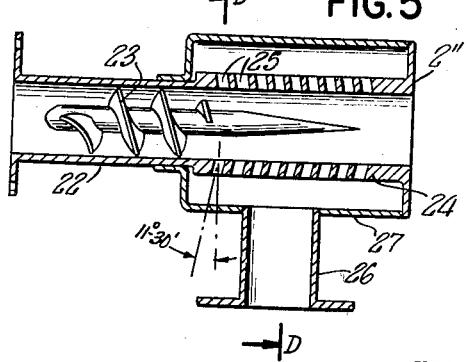

Fig. 1 is a schematic sectional view of a burner (outflow tube),

Figs. 2 and 2' are cross-sectional views on the lines A—A and B—B, respectively, in Fig. 1, Fig. 3 is a schematic sectional view of one embodiment of a premixer of the present invention, Fig. 4 is a cross-sectional view on the line C—C in Fig. 3, Fig. 5 is a schematic sectional view of another embodiment of a premixer of the present invention, and Fig. 6 is a cross-sectional view on the line D—D in Fig. 5.

As in the prior disclosure, the herein-claimed process requires a thorough premixing of the starting material, consisting in the instant case of a vaporized mixture of liquid hydrocarbons and an oxygen portion sufficient to support the desired partial combustion. The devices of said prior disclosure have been found to be entirely suitable for this purpose as the dimensional and thermal requirements are the same. This premixing is attained by means of the impact of the respective gas streams upon each other. For this purpose, the effective components of the kinetic energies of the two gases, vaporized material and oxygen, or, expressed differently, the aliquots of the kinetic energies of the gas flow rates relating to the opposite direction components of the velocities of the two reacting gases, are made equal and, preferably, of a value equivalent to 100–200 kgm./Nm.³ in case of methane (Nm.³ representing one cubic meter of gas at 20° C. and 1 atm. pressure, and kgm. meaning kilogram meter). Corresponding values for the respective hydrocarbon mixtures disclosed herein are established by means of the formula $$\text{Energy} = \text{mass } v.^2/2$$

The two reacting gases are premixed and introduced into the oven or reactor by means of one or several burners, each consisting of a mixer and an outlet tube. According to this invention, the necessary intimate mixing is predicated upon the force of impact and the respective directions of the two gas streams, which must be such as to insure a high level of that component of the velocity which is essential for the impact and the mutual penetration of the two gas streams. Moreover, two extremely thin streams must be produced in order to attain a microscopically uniform composition of the mixed gas stream entering into the burner.

Where, according to this invention, volatilized petroleum fractions are used as starting materials, small amounts of gas black of the order of 1–2 g./Nm.³ can be found in the converted gas. However, the amount of gas black is too small to influence to any extent the thermal and weight balances, and can be readily eliminated by filtration. Moreover, the formation of gas black can be entirely avoided by increasing the ratio between oxygen and volatilized hydrocarbons, provided a somewhat lower yield in H₂+CO is found to be acceptable. This slight increase in the ratio should not go beyond an oxygen:hydrocarbon molar ratio of between 0.5 to 0.8, which is generally applicable for the process.

Referring now in detail to the drawings, the mixers illustrated in Figs. 3 and 5 are meant to be applied to the burner or outflow tube of Fig. 1. This burner consists substantially of the outflow tube 1 itself, applied by means of a flange 2 to the corresponding flange 2' or 2'' of the premixer shown in Fig. 3 or Fig. 5, respectively, from which the hydrocarbon-oxygen mixture enters in the direction of the arrow. Near the front section to which the premixer is fastened, tube 1 is provided with a branch pipe 3 having a safety outlet 4. By means of a partition 5, the front section of the tube is subdivided into several longitudinal outflow chambers, as shown, for example, in cross-section in Fig. 2. The rear section of tube 1 is subdivided in a similar manner by means of a partition 6. However, as indicated in Fig. 2', the walls of this partition are offset, at 45° for example, with respect to the walls of partition 5. Moreover, tube 1 is cooled by means of a double-wall water jacket 7, having an inlet 8 and an outlet 9 for the cooling water, whereby the walls of the jacket are arranged so as to cause the cooling water to circulate in both directions along the interior wall 10 of the jacket and at both sides thereof.

Fig. 3 shows a mixer into which reaction gases enter through two flared ports 11 and 12, respectively. By means of connecting elbow pieces 13 and 14, these ports are joined with tubes 15 and 16 which are in axial alignment and are held at their free extremities by a mixing chamber, the latter comprising a cylindrical section provided with sleeves 17 and an annular hollow member 18 and containing an axially displaceable double-coned obturator or proportioning valve 19, preferably made of stainless steel. As shown, this valve is controlled by a spindle 20, which is provided with a thumbscrew 200 having a scale for varying the size of the inlet openings for oxygen and the hydrocarbon and for indicating the ratio between these openings. Spindle 20 is screw-threadedly mounted for rotation in studs 130 and 140 fixed upon elements 13 and 14 respectively. An indicator sleeve 141 is carried in flange member 142, which is fixed upon stud 140. By means of this valve, the velocity, stream size and impact angle of the two gas streams are readily controlled. Thus the effective components of the kinetic energy of the gas streams as specified above, can be easily regulated. The double-cone 19 deviates or deflects the two gas jets of oxygen and hydrocarbon, coming from the two oppositely aligned ducts 11, 13, 15 and 12, 14, 16, respectively, into the single peripheral annular recess 18. From the latter the mixed gases pass through conduit 21 into the outflow tube 1 of the burner illustrated in Fig. 1. The shape of doubled-coned member 19 makes the gas streams meet with velocities having substantial and oppositely directed axial components. In this way, the desired mixing is achieved.

Another embodiment of the premixer is shown in Figs. 5 and 6. This mixer comprises an inlet tube 22 for the gas to be burned. Fitted into this tube is a helical core 23, preferably of stainless steel, to impart to the incoming gas stream a helicoidal rotation with a substantially high velocity on the tangential plane. Attached to tube 22 is an extension 24 of relatively heavy material provided with a pattern of borings spaced radially about longitudinally along the circumference of the extension. As shown, these borings are drilled at oblique angles through the wall of this extension. Oxygen, entering through lateral tube 26 and the jacket 27, is blown through these borings so that the tangential components of the velocities of the two gases are directed oppositely to each other whereby the oppositely rotatory flow of the two gases is gradually damped. Obviously, this type of mixer also permits a simple control of the velocity, stream size and impact angle of the two gases; these are the factors previously mentioned as essential according to this invention. From the premixer, the gases enter the outflow tube 1 (Fig. 1) substantially without any turbulence, which is important in order to produce a regular and undisturbed flame at the end of the outflow tube and to avoid back-firing.

In addition thereto, an evaporator is required for heating the petroleum fraction or the crude oil to a given distilling temperature in order to obtain the desired fraction in volatilized form. Heat, liberated in the conversion, can be employed for this purpose.

Starting materials that are useful according to this invention are particularly the petroleum fractions that distill practically completely without decomposition and formation of free carbon. In other words, petroleum fractions having a final distillation point not higher than about 320° C. Equally useful are other fractions, such as crude oil, that, although they distill completely at higher temperatures, upon heating to 300–350° C. volatilize while leaving a fluid residue rather than a heavy or even solid deposit comprising free carbon. This fluid residue constitutes a fuel oil which can be utilized for other purposes, such as heating.

The following petroleum fractions can be used:

1. Gasoline _____ Density 0.677, final dist. point 122° C.
2. Naphtha _____ Density 0.771, final dist. point 215° C.
3. Kerosene _____ Density 0.80, final dist. point 320° C.

*Example*

When using kerosene (as in 3, above) having the following characteristics:

Composition:
    Carbon _____ 84%
    Hydrogen _____ 16%
Gross heat value _____ 11,200 Cal.

and mixing it with air enriched with oxygen at the ratio:
Air-0.55 Nm.³/kg. of kerosene, flow rate 110 Nm.³/hour
$O_2$, pure-0.71 Nm.³/kg. of kerosene, flow rate 142 Nm.³/hour
$O_2$, total-0.82 Nm.³/kg. of kerosene, flow rate 164 Nm.³/hour Flow rate of volatilized kerosene _____ 200 kg./hour
Temperature:
    At burner inlet _____ 320° C.
    At burner outlet _____ 950° C.

a converted gas is obtained having the following characteristics:

| | Percent by volume |
|---|---|
| $H_2$ | 46.7 |
| CO | 41.3 |
| $CO_2$ | 0.5 |
| $N_2$ | 11.4 |
| $CH_3$ | 0.1 |

Total volume of converted gas—3.75 Nm.³/kg. of kerosene, 750 Nm.³/hour
Volume of $H_2$+CO per 3.25 Nm.³/kg. of kerosene— 650 Nm.³/hour The propeller-type mixer-burner (Figs. 1 and 6), used in connection with the foregoing examples, has the following construction and operation characteristics:

Volume of mixing chamber _____ 1600 cc.
Axial velocity of the mixture _____ 35 m./sec.
Specific kinetic energy of volatilized kerosene _____ 200 kilogram meters/kg.
Specific kinetic energy of oxidized air____ 200 kilogram meters/kg.

Corresponding tangential velocities—
    Kerosene _____ 63 Nm.³/sec.
    Oxygen _____ 48 Nm.³/sec.
Corresponding actual velocities—
    Kerosene (at 320° C.; 1.1 atm.) _____ 124 m./sec.
    Oxygen (at 70° C.; 1.1 atm.) _____ 56.5 m./sec.

Impact angles of the two gas streams on the horizontal plane tangent—

With propeller _____ 31°
With radial plane _____ 73°

I claim:
1. The process of producing synthesis gas (CO and $H_2$) by a partial combustion in the absence of any catalyst and steam, of a hydrocarbon fraction that volatilizes without decomposition and formation of free carbon upon heating to a temperature up to 300–350° C., said process comprising volatilizing said hydrocarbon fraction, intimately mixing the volatilized hydrocarbon fraction with a gas taken from the group consisting of oxygen and air enriched with oxygen immediately prior to introduction into a reaction chamber by actuating said volatilized hydrocarbon fraction into a helical rotation, gradually cancelling the rotation motion by the impact of a plurality of peripherally arranged jets of gas taken from the group consisting of oxygen and air enriched with oxygen acting oppositely to the direction of rotation of said volatilized hydrocarbon fraction, the oxygen-containing jets and the stream of hydrocarbon impinging upon each other at kinetic energies whose respective opposite directional components are substantially equal, and immediately thereafter introducing the linearly moving premixed gases into the reaction chamber and maintaining a reaction temperature not exceeding 1000° C.

2. The process of producing synthesis gas containing CO and $H_2$ by a partial combustion, in the absence of any catalyst and steam, of a normally liquid hydrocarbon fraction that volatilizes without decomposition and formation of free carbon upon heating to a temperature up to 300–350° C., said process comprising volatilizing said hydrocarbon fraction, intimately pre-mixing the volatilized hydrocarbon fraction with oxygen immediately prior to introduction into the burner of a reaction chamber by impinging upon each other streams of oxygen and of the volatilized hydrocarbon fraction at an oxygen: hydrocarbon molar ratio of between 0.5 to 0.8 and at kinetic energies whose respective opposite effective directional components are substantially equal and equivalent to 100–200 kgm./$Nm.^3$ of gas, based on methane, each of the streams of oxygen and hydrocarbon being individually deflected and spread into a thinned, diverging, conical stream, and the said diverging conical streams being symmetrically and coaxially impinged upon each other to obtain said intimate pre-mixing, introducing the linearly so pre-mixed gases into the burner and maintaining a reaction temperature not exceeding 1000° C. in the reaction zone.

3. The process of producing synthesis gas comprising CO and $H_2$ by a partial combustion, in the absence of any catalyst and steam, of a normally liquid hydrocarbon fraction that volatilizes without decomposition and formation of free carbon upon heating to a temperature up to 300–350° C., said process comprising volatilizing said hydrocarbon fraction, intimately mixing the volatilized hydrocarbon fraction with a gas taken from the group consisting of oxygen and air enriched with oxygen prior to introduction into a reaction zone by impinging upon each other streams of oxygen and of the volatilized hydrocarbon fraction at kinetic energies whose respective opposite effective directional components are substantially equal, said reaction zone comprising a burner zone which provides free space into which the reaction mixture flows with substantially no turbulence, the reacting mixture being constrained against lateral motion in the reaction zone, introducing the linearly moving premixed gases into the reaction zone and maintaining a temperature not exceeding 1000° C.

4. The process of producing synthesis gas containing CO and $H_2$ by a partial combustion in the absence of any catalyst and steam, of a hydrocarbon fraction that volatilizes without decomposition and formation of free carbon upon heating to a temperature up to 300–350° C., taken from the group consisting of gasoline, naphtha, and kerosene, said process comprising volatilizing said hydrocarbon fraction, intimately mixing the volatilized hydrocarbon fraction with a gas taken from the group consisting of oxygen and air enriched with oxygen immediately prior to introduction into a reaction chamber by actuating said volatilized hydrocarbon fraction into a helical rotation, gradually cancelling the rotation motion by the impact of a plurality of peripherally arranged jets of gas taken from the group consisting of oxygen and air enriched with oxygen acting oppositely to the direction of rotation of said volatilized hydrocarbon fraction, the oxygen containing jets and the stream of hydrocarbon impinging upon each other at kinetic energies whose respective opposite directional components are substantially equal, and immediately thereafter introducing the linearly moving premixed gases into the reaction chamber and maintaining a reaction temperature not exceeding 1000° C.

References Cited in the file of this patent

UNITED STATES PATENTS

| | | |
|---|---|---|
| 1,918,397 | Jezler | July 18, 1933 |
| 2,275,394 | Hardgrove | Mar. 3, 1942 |
| 2,491,518 | Riblett | Dec. 20, 1949 |
| 2,582,938 | Eastman | Jan. 15, 1952 |
| 2,672,488 | Jones | Mar. 16, 1954 |
| 2,692,193 | Riesz | Oct. 19, 1954 |
| 2,701,756 | Eastman | Feb. 8, 1955 |

FOREIGN PATENTS

| | | |
|---|---|---|
| 441,824 | Germany | Mar. 14, 1927 |
| 255,080 | Great Britain | Sept. 22, 1927 |